United States Patent [19]
Odake et al.

[11] Patent Number: 5,653,899
[45] Date of Patent: Aug. 5, 1997

[54] METHOD OF MAKING A STEEL PIPE BY ELECTRIC RESISTANCE HEATING OF OPPOSING EDGES OF A SHEET PRIOR TO LASER WELDING

[75] Inventors: Takayuki Odake; Yoshiichi Ishizawa; Toshihiro Takamura; Yutaka Nagahama, all of Kawasaki, Japan

[73] Assignee: NKK Corporation, Tokyo, Japan

[21] Appl. No.: 509,543

[22] Filed: Jul. 31, 1995

[30] Foreign Application Priority Data

Aug. 5, 1994 [JP] Japan ................... 6-202993

[51] Int. Cl.$^6$ ................................................ B23K 26/00
[52] U.S. Cl. ................................................ 219/121.64
[58] Field of Search ........................ 219/121.63, 121.64

[56] References Cited

U.S. PATENT DOCUMENTS

| | | |
|---|---|---|
| 4,388,123 | 6/1983 | Murayama . |
| 4,574,176 | 3/1986 | Sharp ................... 219/121.64 |
| 4,649,256 | 3/1987 | Minamida et al. ........... 219/121.64 |
| 4,827,099 | 5/1989 | Krebs et al. ............ 219/121.64 |
| 5,304,777 | 4/1994 | Pons et al. ............ 219/121.64 |

FOREIGN PATENT DOCUMENTS

| | | |
|---|---|---|
| 0 270 952 | 6/1988 | European Pat. Off. . |
| 3134532 | 3/1982 | Germany . |
| 57-16184 | 4/1982 | Japan . |
| 63-251116 | 10/1988 | Japan . |

OTHER PUBLICATIONS

Patent Abstracts of Japan, vol. 17, No. 298 (M-1425), 8 Jun. 1993 of JP-A-05 023867 (Nippon Steel) 2 Feb. 1993.
Patent Abstracts of Japan, vol. 14, No. 416 (M-1021), 7 Sep. 1990 of JP-A-02 160189 (Sumitomo Metal Ind Ltd), 20 Jun. 1990.
Patent Abstracts of Japan, vol. 13, No. 305 (M-849), 13 Jul. 1989 of JP-A-01 095814 (NKK Corp) 13 Apr. 1989.

*Primary Examiner*—Geoffrey S. Evans
*Attorney, Agent, or Firm*—Frishauf, Holtz, Goodman, Langer & Chick, P.C.

[57] ABSTRACT

A method for manufacturing a laser-welded steel pipe, comprising: (a) providing a hot-rolled steel sheet consisting essentially of 0.005 to 0.2 wt. % C, 0.1 to 0.35 wt. % Si, 0.5 to 2 wt. % Mn, 0.01 wt. % or less P, 0.003 wt. % or less S, 0.001 to 0.1 wt. % Nb, 0.001 to 0.006 wt. % Ca and the balance being Fe; (b) continuously forming an open pipe by passing the hot-rolled steel sheet through multi-stage forming rolls, the open pipe having opposed edge faces which confront each other; (c) heating the opposed edge faces of the open pipe by electric resistance heating; and (d) pressure-welding the heated opposed edge faces together by projecting a laser beam in a substantially vertical direction onto an edge joining point of the opposed edge faces and squeezing the opposed edge faces together by passing the open pipe through opposing rolls, to control an upset, the upset being a difference between a coil width (mm) of the open pipe and a circumferential length of the pipe formed after welding (mm).

12 Claims, 1 Drawing Sheet

Figure
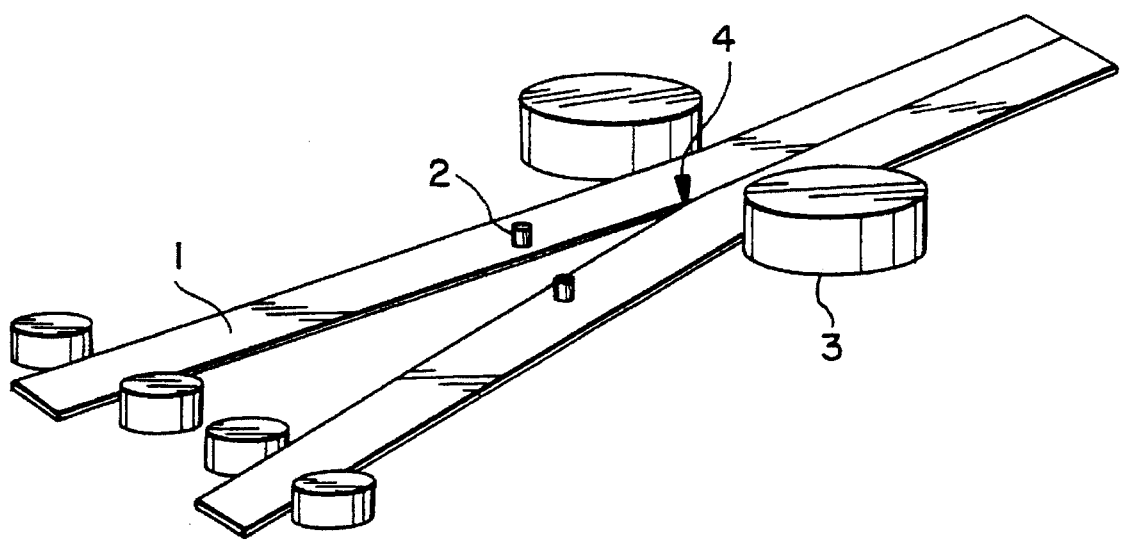

METHOD OF MAKING A STEEL PIPE BY ELECTRIC RESISTANCE HEATING OF OPPOSING EDGES OF A SHEET PRIOR TO LASER WELDING

BACKGROUND OF THE INVENTION

1. Field of the Invention

The present invention relates to a method for manufacturing an electric-resistance-welded steel pipe which is used under a wet hydrogen sulfide environment.

2. Description of the Related Arts

Steel pipes which transfer petroleum and natural gas including hydrogen sulfide are susceptible to hydrogen-induced cracking (hereinafter referred to simply as "HIC") and sulfide stress corrosion cracking (hereinafter referred to simply as "SSCC"). The presumed mechanism of HIC generation is that, under an environment with the presence of hydrogen sulfide, hydrogen generated by the corrosion of steel surface becomes hydrogen atoms, which atoms easily penetrate into the steel body, and the atomic hydrogen generates bubbles in the vicinity of non-metallic inclusion in the steel, and the pressure of generated bubbles induces cracks. The cracks further propagate through a non-uniform region such as a segregated zone and a ferrite-pearite interface to develop a large crack.

Examined Japanese Patent Publication No. 57-16184 discloses a steel material having a good HIC resistance property which is used for a pipeline. The steel material consists essentially of 0.03 to 0.20 wt. % C, 0.01 to 0.50 wt. % Si, 0.03 wt. % or less P, 0.002 to 0.005 S, 0.01 to 0.10 wt. % Al, more than 1.2 wt. % and 2 wt. % or less Mn, oxygen which is inevitably contained in the steel material, 50 ppm or less Ca which is added in accordance with oxygen content [% O] and sulfur content [% S], and the balance being Fe and inevitable impurities. The oxygen content [% O], the sulfur content [% S] and the Ca content [% Ca] satisfy the following equation:

$$[\% \text{ Ca}] \times \{1 - 97[\% \text{ O}]\}/[\% \text{ S}] \geq 1.0.$$

A steel slab cast by a continuous casting process or a steel ingot of 400 mm or more in thickness, which has the above-mentioned composition, is subjected to rolling. In this prior art, the shape control of inclusion by Ca addition prevents the inclusion from becoming the starting point of cracks.

On the other hand, SSCC is a cracking that occurs during the stress application, and the phenomenon differs from the mechanism of HIC. Both types of cracking are, however, common in that the hydrogen which enters into the steel triggers the cracks from the point of non-metallic inclusion. Accordingly, reduction of non-metallic inclusion improves the SSCC resistance.

For the hot-rolled steel sheet as the base material of electric-resistance-welded steel pipe, both the resistance to HIC and the resistance to SSCC are necessary to be improved by the above-described countermeasures.

The characteristics of electric-resistance-welded steel pipe are, however, not improved solely by the improvement of base material. The presumed reason is that inclusion consisting mainly of fine oxide exists on a joining face at the electroseaming section and that hydrogen concentrates to the face to bring the inclusion as the starting point of cracks.

Unexamined Japanese Patent Publication No. 63-241116 discloses a method for a electric-resistance welded steel pipe having a excellent SSCC resistance property. A steel strip is prepared. The steel strip consists essentially of 0.15 to 0.35 wt. % C, 0.1 to 0.8 wt. % Si, 0.2 to 0.5 wt. % Mn, 0.2 to 0.6 wt. % Cr, 0.05 to 0.25 wt. % Mo, 0.01 to 0.06 wt. % Al, at least one element selected from 0.01 to 0.15 wt. % Zr and 0.001 to 0.15 Hf, at least one element selected from the group consisting of 0.01 to 0.15 wt. % Nb, 0.01 to 0.15 wt. % V and 0.01 to 0.15 wt. % Ti, the balance being Fe and inevitable impurities. P and S are contained as impurities. The amount of P is 0.02 wt. % or less and the amount of S is 0.005 wt. % or less. A ratio of Mo wt. % to Cr wt. %, that is, Mo (wt. %)/Cr (wt. %) is from 0.2 to 0.4. An electroseaming section of the strip is heated in a non-oxidizing atmosphere. The electroseaming section is electrically welded so that an upset or a difference between outer circumferential length of the pipe before and after welding may be from 25 to 125% of wall thickness. Then the produced pipe is heated to a temperature of 920° to 1020° C., quenched from the temperature and tempered.

Actually, however, there has not been developed a method that has an excellent shielding property and is durable for continuous operation.

SUMMARY OF THE INVENTION

It is an object of the present invention to provide a method for manufacturing an electric-resistance-welded steel pipe having a excellent HIC resistance property and SSCC resistance property under a wet hydrogen sulfide environment.

To attain the aforementioned object, the present invention provides a method for manufacturing an electric-resistance-welded steel pipe, comprising the steps of:

(a) preparing a hot-rolled steel sheet consisting essentially of 0.005 to 0.2 wt. % C, 0.1 to 0.35 wt. % Si, 0.5 to 2 wt. % Mn, 0.01 wt. % or less P, 0.003 wt. % or less S, 0.001 to 0.1 wt. % Nb, and 0.001 to 0.006 wt. % Ca and the balance being Fe;

(b) forming continuously an open pipe from the hot-rolled steel sheet using a multi-stage forming rolls, the open pipe having both edges which confront each other;

(c) heating the both edges of the open pipe using a heat by electric resistance; and (d) pressure-welding both of the edges which were heated by electric resistance by applying irradiation of laser beam and controlling a upset using a set of squeezing rolls, the upset being a difference between a coil width (mm) before pipe forming and a circumferential length of pipe (mm).

The hot-rolled steel sheet can further contain at least one element selected from the group of 0.05 to 0.5 wt. % Cu, 0.5 wt. % or less Ni, 0.5 wt. % or less Mo, 1 wt. % or less Cr, 0.001 to 0.1 wt. % V, and 0.001 to 0.1 wt. % Ti.

The upset can be controlled to bring about a metal flow rise angle at the electroseaming section to 45 degree or less.

BRIEF DESCRIPTION OF THE DRAWING

The FIGURE is a schematic drawing of a welding simulator of the Example set forth hereinbelow.

DESCRIPTION OF THE EMBODIMENT

The reasons for the limitation of the content of each component is described below.

It is necessary to add 0.005 wt. % or more carbon for securing the strength of steel. From the view point of weldability and toughness, however, the upper limit of carbon is specified as 0.2 wt. %.

It is necessary to add 0.1 wt. % or more silicon as a deoxidizer for steel. Excessive addition of silicon, however, results in a formation of brittle steel structure. So the upper limit of silicon is specified as 0.35 wt. %.

It is necessary to add 0.5 wt. % or more of manganese for securing the strength of steel. Excessive addition, of manganese however, deteriorates the toughness. So the upper limit of manganese is specified as 2 wt. %.

Since P deteriorates the HIC resistance of steel, the upper limit is specified as 0.01 wt. %.

Since S deteriorates the HIC resistance of steel, the upper limit is specified as 0.003 wt. %.

It is necessary to add 0.001 wt. % or more niobium for securing the strength of steel. Excessive addition, of niobium however, deteriorates the toughness of steel. So the upper limit of niobium is specified as 0.1 wt. %.

Calcium addition at an amount of 0.001 wt. % or more makes the shape of inclusion a granule, and Ca may be added, at need, to improve the HIC resistance through the shape control. Excessive addition of calcium, however, deteriorates the toughness of steel. So the upper limit of calcium is specified as 0.006 wt. %.

Copper addition at an amount of 0.05 wt. % or more prevents the diffusion of hydrogen through steel and improves the HIC resistance, it may be added at need. Excessive addition, of copper however, deteriorates the hot-ductility of steel. So the upper limit of copper is specified as 0.5 wt. %.

Since Ni and Mo improve the HIC resistance of steel, they may be added at need. Excessive addition, of Ni and Mo however, deteriorates the SSCC resistance. So upper limit of each of them is specified as 0.5 wt. %.

Chromium improves the resistance to carbon dioxide corrosion of steel. The addition of Cr above 1 wt. %, however, deteriorates the weldability of steel so that the upper limit is specified as 1 wt. %.

Vanadium and Ti increase the strength of steel when each of them is added as a rate of 0.001 wt. % or more. Excessive addition, of vanadium and titanium however, deteriorates the toughness of steel. So the upper limit of each of them is specified as 0.1 wt. %.

That is the reason why each of the added element is limited.

The working method is described in the following.

The reason why the conventional method for manufacturing electric-resistance-welded steel pipe gives poorer resistance to HIC and SSCC at the electroseamed portion than that of the base material is that the inclusion generated during electroseaming stage and consisting mainly of oxides and being left on the joining face is exposed on the bead face by the machining of welded bead, which exposed inclusion then becomes the starting point of hydrogen cracks.

At the electroseamed section, normally a strong aggregate structure appears by an upset application after the heating stage. The structure is observed under a microscopic photograph of a bead section as the metal flow rises. That type of structure is a cause of deterioration in the mechanical properties of the electric-resistance-welded steel pipe, and the structure is also not desirable from the standpoint of SSCC resistance. Nevertheless, the prior art method unavoidably applies a strong upset to discharge the oxides which were generated on the joining face. As a result, a strong aggregate structure occurred in the prior art.

The upset is defined as follows:

Upset (mm)=Coil width (mm) before pipe forming−Circumferencial length of pipe (mm).

In addition to the conventional application of electrical heating, the irradiation of laser beam fuses the oxides generated on the joining face and finely disperses the fused oxides to avoid providing a starting point of the crack. Consequently, the HIC resistance and SSCC resistance are improved.

In the present invention, no increased upset is necessary. By reducing the upset degree to prevent the generation of agglomerated structure specific to the electroseamed steel pipe, the mechanical properties and SSCC resistance at the electroseamed section are improved. The metal flow rise angle is an index of the aggregated structure at the electroseamed section. If the angle exceeds 45 degree, the deterioration of SSCC resistance at the electroseamed section becomes significant. Therefore, the angle is preferably selected at 45 degree or less.

According to the present invention, the hot-rolled steel sheet having the composition described hereinabove is subjected to laser beam irradiation immediately before squeezing by squeezing rolls in a conventional facility for manufacturing electroseamed steel pipes, and to compression welding thereof.

EXAMPLE

Steels having chemical composition listed in Table 1 were melted in vacuum in a laboratory equipment to cast 50 kg ingots. Each of the ingots was heated to 1200° C. and rolled to form a sheet having 50 mm thickness, then the sheet was cooled by air. The sheet types A through E in Table 1 have the composition within the range of the present invention. The sheet type F does not include Ca and the composition is outside of the range of the present invention. A strip of 50×150×400 mm was cut from each of the sheet, which strip was rolled to a thickness as an 12 mm by heating up to 1200° C., and to 820° C. of end point. Immediately after the rolling, a mist spray was applied to cool the rolled sheet to 550° C. at a cooling rate of about 10° C./sec. Then the sheet was inserted into a furnace which was heated to 550° C. in advance for cooling thereof. The procedure was a simulated pattern of an actual hot-rolling process.

A specimen having a size of 12×35×2000 mm was cut from each of the sheets which was cooled to room temperature. The specimen was welded by an electroseaming simulator. The simulator is illustrated in the FIGURE. Two steel sheets 1 are fed to multistage forming rolls, and the steel sheet edges facing each other are heated by resistance induced by high frequency current supplied from the contact chip 2. Then the edges are processed by compression welding using the squeezing rolls 3. The simulator further enables to irradiate a carbon dioxide gas laser beam 4 to the edge joining section.

The welding conditions were 10⁻ m/min. of welding speed, 700 kW of applied power supplied from the contact chip, and 0 to 4 mm of variable upset. The laser output was 5 kW, and the beam diameter at the focusing point was 0.5 mm. The irradiation was conducted from a position vertically upward of the steel sheet, while focusing on the edge joining point.

The HIC test was applied at the welded section and the base material. The test was conducted in accordance with NACE TM0284-87 except for a change of test solution. The specimen was cut along the welded direction to provide a size of 10×20×100 min. The whole surface of the specimen was wet-polished to #320. The test solution was 5% NaCl+ 0.5% CH$_3$COOH aqueous solution saturated with hydrogen sulfide at 1 atm. The specimen was immersed into the test solution at 25° C. for 96 hrs. Then, the specimen was cut to four equal pieces along the longitudinal direction. The three cut sections were observed for checking crack generation, and an evaluation was given by a crack sensitivity rate.

The SSCC test was carried out using a tension type tester confirming to NACE TM0177-90 Method A. The specimen was a round rod tensile test specimen which was cut lateral to the welding direction, having a size of 3.81 mm of diameter at the parallel section, 25 mm of length at parallel section, and being wet-polished to #600.The specimen was applied with a specified stress in the test solution having the same composition with that used in HIC test. The applied stress level was changed to determine the minimum stress (σth) which does not generate crack during the test period of 720 hrs. The SSCC resistance was evaluated from a ratio of σth to σys, where σys is the yield stress obtained by a tensile test in air.

The test result is given in Table 2. The table shows that the electroseamed steel pipes produced from the steels having the composition range of the present invention and formed under the laser beam irradiation give a favorable crack sensitivity rate (CSR) and a good ratio of the minimum stress (σth) to the yield stress (σys), (σth/σys). Furthermore, for the case of a metal flow rise angle of 45 degree or more, these figures become more preferable.

TABLE 1

| No. | C | Si | Mn | P | S | Nb | Ca | Cu | Ni | Mo | Cr | V | Ti | σys Kg/mm² | CSR % | σth/σys % |
|---|---|---|---|---|---|---|---|---|---|---|---|---|---|---|---|---|
| A | 0.05 | 0.21 | 1.08 | 0.002 | 0.0005 | 0.042 | 0.0026 | — | 0.30 | 0.22 | — | 0.053 | 0.016 | 49.2 | 1.5 | 75 |
| B | 0.01 | 0.31 | 1.95 | 0.001 | 0.0007 | 0.057 | 0.0035 | — | — | — | 0.45 | — | — | 75.8 | 2.0 | 80 |
| C | 0.08 | 0.14 | 0.7 | 0.004 | 0.0021 | 0.037 | 0.0012 | 0.25 | — | — | — | 0.060 | — | 44.7 | 5.5 | 70 |
| D | 0.15 | 0.26 | 0.78 | 0.004 | 0.0008 | 0.038 | 0.0023 | — | — | — | — | 0.055 | — | 46.7 | 2.0 | 75 |
| E | 0.04 | 0.20 | 1.45 | 0.003 | 0.0010 | 0.037 | 0.0020 | — | — | — | — | — | — | 50.2 | 2.5 | 75 |
| F | 0.05 | 0.23 | 1.46 | 0.012 | 0.0043 | 0.040 | — | — | — | — | — | — | — | 51.4 | 20.0 | 60 |

(wt %)

TABLE 2

| Steel tested | Laser irradiation | Upset (mm) | Metal flow rise angle | CRS (%) | σth/σys (%) | Remark |
|---|---|---|---|---|---|---|
| A | not applied | 2.1 | 65° | 8.0 | 50 | Comparative Example |
| A | applied | 0.4 | 2° | 1.5 | 75 | Example |
| A | applied | 1.9 | 42° | 1.0 | 75 | Example |
| A | applied | 2.3 | 55° | 1.5 | 75 | Example |
| A | applied | 3.2 | 67° | 1.5 | 75 | Example |
| B | not applied | 1.2 | 43° | 9.5 | 60 | Comparative Example |
| B | applied | 0.6 | 5° | 1.5 | 80 | Example |
| B | applied | 1.3 | 18° | 1.5 | 80 | Example |
| B | applied | 2.0 | 48° | 2.0 | 80 | Example |
| C | not applied | 1.5 | 50° | 15.0 | 50 | Comparative Example |
| C | applied | 0.3 | 0° | 3.0 | 70 | Example |
| C | applied | 1.8 | 40° | 3.5 | 70 | Example |
| C | applied | 4.2 | 82° | 4.5 | 70 | Example |
| D | not applied | 1.6 | 44° | 8.5 | 50 | Comparative Example |
| D | applied | 1.6 | 40° | 2.0 | 75 | Example |
| E | not applied | 2.0 | 51° | 10.0 | 55 | Comparative Example |
| E | applied | 2.0 | 48° | 2.5 | 75 | Example |
| F | not applied | 1.8 | 47° | 25.5 | 45 | Comparative Example |
| F | applied | 1.8 | 44° | 18.5 | 55 | Comparative Example |

What is claimed is:

1. A method for manufacturing a laser-welded steel pipe, comprising:
   (a) providing a hot-rolled steel sheet consisting essentially of 0.005 to 0.2 wt. % C, 0.1 to 0.35 wt. % Si, 0.5 to 2 wt. % Mn, 0.01 wt. % or less P, 0.003 wt. % or less S, 0.001 to 0.1 wt. % Nb, 0.001 to 0.006 wt. % Ca and the balance being Fe;
   (b) continuously forming an open pipe by passing the hot-rolled steel sheet through multi-stage forming rolls, the open pipe having opposed edge faces which confront each other;
   (c) heating the opposed edge faces of the open pipe by electric resistance heating; and
   (d) pressure-welding the heated opposed edge faces together by projecting a laser beam in a substantially vertical direction onto an edge joining point of said opposed edge faces and squeezing said opposed edge faces together by passing the open pipe through opposing rolls, to control an upset, the upset being a difference between a coil width (mm) of the open pipe and a circumferential length of the pipe formed after welding (mm).

2. The method of claim 1, wherein the hot-rolled steel sheet consists essentially of 0.005 to 0.2 wt. % C, 0.1 to 0.35 wt. % Si, 0.5 to 2 wt. % Mn, 0.01 wt. % or less P, 0.003 wt. % or less S, 0.001 to 0.1 wt. % Nb, 0.001 to 0.006 wt. % Ca, at least one element selected from the group of 0.05 to 0.5 wt. % Cu, 0.5 wt. % or less Ni, 0.5 wt. % or less Mo, 1 wt. % or less Cr, 0.001 to 0.1 wt. % V, and 0.001 to 0.1 wt. % Ti, and the balance being Fe.

3. The method of claim 1, wherein the upset is controlled such that a metal flow rise angle at the edge joining point is 45 degrees or less.

4. The method of claim 3 wherein the metal flow rise angle is 55° to 82°.

5. The method of claim 1, wherein the hot-rolled steel sheet consists essentially of 0.05 wt. % C, 0.21 wt. % Si, 1.08 wt. % Mn, 0.002 wt. % P, 0.0005 wt. % S, 0.042 wt. % Nb, 0.0026 wt. % Ca, 0.30 wt. % Ni, 0.22 wt. % Mo, 0.053 wt. % V, 0.016 wt. % Ti and the balance being Fe.

6. The method of claim 1, wherein the hot-rolled steel sheet consists essentially of 0.01 wt. % C, 0.31 wt. % Si, 1.95 wt. % Mn, 0.001 wt. % P, 0.0007 wt. % S, 0.057 wt. % Nb, 0.0035 wt. % Ca, 0.45 wt. % Cr and the balance being Fe.

7. The method of claim 1, wherein the hot-rolled steel sheet consists essentially of 0.08 wt. % C, 0.14 wt. % Si, 0.7 wt. % Mn, 0.004 wt. % P, 0.0071 wt. % Si, 0.037 wt. % Nb, 0.0012 wt. % Ca, 0.25 wt. % Cu, 0.060 wt. % V and the balance being Fe.

8. The method of claim 1, wherein the hot-rolled steel sheet consists essentially of 0.15 wt. % C, 0.26 wt. % Si, 0.78 wt. % Mn, 0.004 wt. % P, 0.008 wt. % S, 0.038 wt. % Nb, 0.0023 wt. % Ca, 0.055 wt. % V and the balance being Fe.

9. The method of claim 1, wherein the hot-rolled steel sheet consists essentially of 0.04 wt. % C, 0.20 wt. % Si, 1.45 wt. % Mn, 0.003 wt. % P, 0.0010 wt. % S, 0.037 wt. % Nb, 0.0020 wt. % Ca and the balance being Fe.

10. The method of claim 1, wherein the laser has an output of 5 kW and the laser beam has a beam diameter at a focusing point of 0.5 mm.

11. The method of claim 1, wherein the upset is 0 to 4 mm.

12. The method of claim 1, wherein the upset is from 0 to 40 mm.

* * * * *